UNITED STATES PATENT OFFICE 2,373,190

PREPARATION OF UNSATURATED NITRILES

Frederick E. Kung, Akron, Ohio, assignor to The B. F. Goodrich Company, New York, N. Y., a corporation of New York No Drawing. Application June 4, 1940,
Serial No. 338,755

6 Claims. (Cl. 260—464)

This invention relates to a method of preparing unsaturated nitriles by the catalystic dehydration of unsaturated amides and is particularly concerned with the use of a manganese oxide as the catalyst for this dehydration.

It is known that saturated nitriles may be produced by the vapor phase dehydration of the corresponding saturated amides by passing the amide over a catalyst such as alumina, thoria, pumice, zeolites, activated graphite and the like. It is also known that formamide vapor, when passed over a dehydration catalyst, decomposes into hydrogen cyanide and water. Difficulty has been experienced, however, in applying this reaction to the production of unsaturated nitriles, and in particular to alpha-beta unsaturated nitriles such as the acrylic nitriles because of the greater ease with which unsaturated compounds undergo polymerizations and/or decompositions to yield undesirable tarry products. The dehydration of acrylamide to acrylonitrile by distillation over phosphorus pentoxide, a powerful dehydrating agent, has been reported but the yields are very low and the method is not at all suited for technical adoption.

An object of the invention, therefore, is to provide a commercially satisfactory method of obtaining the nitriles of unsaturated carboxylic aliphatic acids from the corresponding amides. Another object is to provide a catalyst which will bring about this synthesis while preventing the formation of undesirable tarry polymerized products. Further objects will appear hereinafter.

The objects of the present invention are attained by employing a manganese oxide catalyst for the vapor phase dehydration of unsaturated amides to unsaturated nitriles. Any of the various manganese oxides serve as suitable catalysts for this dehydration. Thus the catalyst may be prepared from a naturally occurring manganese oxide such as pyrolusite or manganese dioxide, $MnO_2$, manganous oxide, $MnO$, mangano manganic oxide, $Mn_3O_4$, or another oxide of manganese. The preferred catalyst is a fused or sintered manganese oxide catalyst in the solid or lumpy form in contradistinction to a powdered or pulverulent form. This form of oxide can readily be prepared by fusing pyrolusite or by fusing in an oxyhydrogen flame an organic salt of manganese such as manganese acetate or simply by fusing any flocculent manganese oxide. After fusion the solid oxide is cooled, crushed and screened to the desired particle size. For most purposes of this invention it is desirable to use an oxide of particle size from 8–14 mesh. The catalyst may be employed unsupported in lump form or if in powdered form on any suitable support such as kieselguhr, silica gel and the like.

In the practice of this invention an unsaturated amide is vaporized by allowing it to come in contact with a suitable vaporization surface and the vapors are then passed over the manganese oxide catalyst at an elevated temperature. The preferred temperature range for dehydration is between 400° and 550° C. Condensation of the vapors passing out of the reaction chamber yields water and the desired unsaturated nitrile. Atmospheric pressure may be used throughout the process or either elevated or reduced pressures may be employed. Reduced pressure is sometimes desirable in order to avoid decomposition of the amide or the nitrile during the dehydration. An inert gas such as nitrogen or water vapor may be passed through the reaction chamber along with the vaporized amide if preferred. The velocity of the gas should be so regulated as to secure the maximum yield.

By the use of this invention it is possible to prepare unsaturated nitriles in good yields from unsaturated amides. The preferred compounds to be used are the alpha-beta unsaturated amides of aliphatic acids such as acrylic amide, methacrylic amide, ethacrylic amide, crotonic amide, propiolic amide and the like.

The invention will be illustrated by means of the following examples but it will be understood that it is not limited by the details therein set forth.

*Example 1.*—Seventeen grams of acrylamide and 12 g. of water are vaporized by allowing the material to drop on heated particles of silica. The vapors formed are passed into a reaction chamber packed with copper rings and charged with a catalyst made by fusing pyrolusite. A temperature of 490–500° C. is maintained in the reaction chamber. Twenty-seven grams of condensate are formed, from which 8.5 g. of acrylonitrile (B. P. 66°–77°) is obtained by distillation of the non-aqueous layer. This represents a yield of 67%.

*Example 2.*—An experiment similar to that described in Example 1 is performed using instead of atmospheric pressure, an absolute pressure of 18–25 mm. of mercury. Acrylonitrile is obtained in 75% yield.

*Example 3.*—Methacrylamide is passed over manganous oxide at 400° C. using conditions similar to those in Example 1. Methacrylonitrile is obtained in good yields.

It will be apparent to those skilled in the art that many changes may be made in the details described in the above specification without departing from the invention or sacrificing its advantages.

I claim:

1. The process of producing a nitrile of an alpha-beta unsaturated aliphatic acid which comprises dehydrating the amide of said acid by passing the vaporized amide over a manganese oxide catalyst at a temperature of 400–550° C.

2. The process of producing acrylonitrile from acrylamide which comprises dehydrating acrylamide by passing vapors of the same over a manganese oxide catalyst at a temperature of 400–550° C.

3. The process of producing acrylonitrile from acrylamide which comprises dehydrating acrylamide by passing vapors of the same at 400–550° C. over a catalyst prepared by fusing pyrolusite.

4. The process of producing methacrylonitrile from methacrylamide which comprises dehydrating methacrylamide by passing vapors of the same over a manganese oxide catalyst at a temperature of 400–550° C.

5. The process of producing methacrylonitrile from methacrylamide which comprises dehydrating methacrylamide by passing vapors of the same at 400–550° C. over a catalyst prepared by fusing pyrolusite.

6. The process of producing an alpha-beta unsaturated aliphatic acid nitrile which comprises catalytically dehydrating an alpha-beta unsaturated aliphatic acid amide in the vapor phase in presence of a manganese oxide catalyst.

FREDERICK E. KUNG.